United States Patent

[11] 3,628,445

| [72] | Inventor | Georges R. Weber<br>Geneva, Switzerland |
|---|---|---|
| [21] | Appl. No. | 835,376 |
| [22] | Filed | June 23, 1969 |
| [45] | Patented | Dec. 21, 1971 |
| [73] | Assignee | Research Development Techniques, Inc.<br>Staten Island, N.Y.<br>a part interest |

[54] IRRADIATION DEVICE
7 Claims, 3 Drawing Figs.

[52] U.S. Cl. ..................................... 99/277.1,
250/48
[51] Int. Cl. ........................................... C12h 1/06
[50] Field of Search........................................... 99/276,
275, 277, 277.1, 277.2, 278, 11, 29, 30, 48; 16/87
R, 94 R; 195/128, 132, 133; 250/48; 312/138 R

[56] References Cited
UNITED STATES PATENTS

| 215,811 | 5/1879 | Eberhardt | 195/133 X |
|---|---|---|---|
| 625,650 | 5/1899 | Day et al | 99/48 |
| 1,186,642 | 6/1916 | Alamy | 312/138 R X |
| 1,193,143 | 8/1916 | Henri et al. | 250/48 |
| 1,945,008 | 1/1934 | Voigt | 16/87 R X |
| 1,954,065 | 4/1934 | Bragg | 250/48 X |
| 2,893,069 | 7/1959 | Kessler | 16/94 R X |
| 3,037,116 | 5/1962 | Weber | 250/48 |
| 3,079,498 | 2/1963 | Ruffin | 250/48 X |
| 3,468,240 | 9/1969 | Huppmann | 99/276 |

*Primary Examiner*—Robert W. Jenkins
*Assistant Examiner*—Arthur O. Henderson
*Attorney*—Sherman and Shalloway

ABSTRACT: A device for irradiating alcoholic beverages and including a pair of parallel plates forming a compartment therebetween with means for dividing the compartment into a number of inner communicating chambers so that beverage passing from one end of the compartment to the other must follow a tortuous path through the chambers. An actinic light source is positioned adjacent one of the plates of the device and means are provided for pumping alcoholic beverages through the device in order to accelerate the aging process of such beverages.

PATENTED DEC 21 1971

3,628,445

INVENTOR
GEORGES WEBER

BY Sherman & Shalloway
ATTORNEYS 3,628,445

IRRADIATION DEVICE

This invention relates to an apparatus for the treatment of alcoholic beverages with actinic light in order to accelerate the aging process of the beverage and specifically contemplates an apparatus by which the beverage is passed through a tortuous path and subjected to the actinic light rays.

In my prior U.S. Pat. No. 3,037,116, I disclose an apparatus for the irradiation of liquids. The present invention is an improved device for the irradiation of liquids and makes available a much more simple device, the construction of which is more economical and provides a great flexibility in the irradiation of alcoholic beverages. I have now found that the irradiation of alcoholic beverages in order to accelerate the aging process can be accomplished by directly subjecting the beverage to actinic radiation without the necessity of having the light rays diffuse into transparent plates of an irradiation device and then into the liquids as was previously contemplated. With the present device, I am able to accelerate the aging of alcoholic beverages by an apparatus that is simple in construction and does not require the detailed structural features previously considered necessary.

The present invention contemplates an irradiating unit of simple construction requiring a minimum of parts and assembly time so that the unit can be produced must more economically than previous devices in the art. Briefly, the present invention contemplates at least a pair of plates which are maintained in spaced parallel relationship to form a chamber therebetween and means dividing the chamber into a plurality of communication compartments so that alcoholic beverages pumped through the chamber must follow a tortuous path while the liquid is being subjected directly to the irradiation effect of the rays of the actinic light source.

Accordingly, it is an object of this invention to provide a simplified irradiation unit having a tortuous path through which alcoholic beverage is flowed and subjected to irradiation from an actinic light source.

It is another object of this invention to provide an irradiating unit having a tortuous path with channel members clamping the separated plates in rigid, fluidtight relationship in order to control the flow of beverages which may be easily assembled and disassembled for cleaning.

Still another object of this invention is to provide an irradiating apparatus which includes a chamber that is tilted relative to the horizontal so that alcoholic beverage forced through the chamber from the lower portion thereof the upper portion thereof ensures that all the air is expelled from the chamber during the irradiation process.

A more specific object of this invention is to provide an irradiating unit comprised of two spaced parallel plates having an actinic light source spaced from the face of one of the plates with said one plate being of a material permeable to such light rays and means dividing the chamber into a plurality of communicating compartment so that liquid forced through the chamber must follow a tortuous path.

These and other objects of the invention will become apparent, when consideration is given to the following detailed description of a preferred embodiment of the invention, which is exemplary only, when taken in conjunction with the accompanying drawings wherein.

Figure 1:
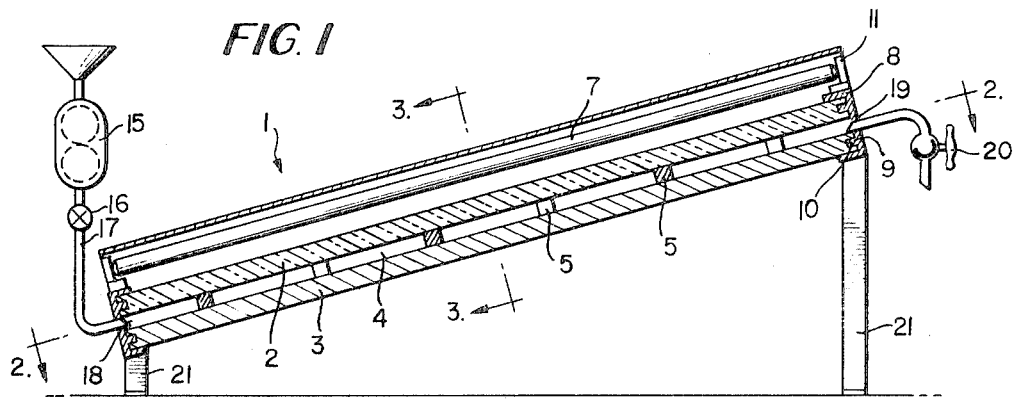
FIG. 1 is an elevation of the irradiating unit, partially in cross section.

Referring now to FIG. 1, the irradiating unit is indicated generally at 1. The unit is illustrated as including a pair of plates, the upper plate 2 and lower plate 3. These plates are mounted in parallel relationship to form a thin chamber 4 therebetween through which the liquid to be irradiated is passed.

The chamber 4 is divided into a number of communicating compartment of the dividers 5. As clearly seen in FIG. 2, the dividers are arranged such that liquid passing through the chamber must follow a tortuous path as is generally indicated as 6. This tortuous path is formed by having the dividers of a length less than the width of the chamber and alternately arranging a first end of the dividers against one side of the chamber and then the other. The second end of each divider is thus spaced from the opposite side of the chamber whereby fluid can pass between the divider and the opposite side of the chamber. In order for the fluid to continue on its flow path, it must reverse directions and flow to the opposite side of the chamber where it passes between the second end of the next proceeding divider and the edge of the chamber.

The dividers may be made of any suitable material and may be formed integrally with either the upper plate 2 or the lower plate 3.

Figure 2:
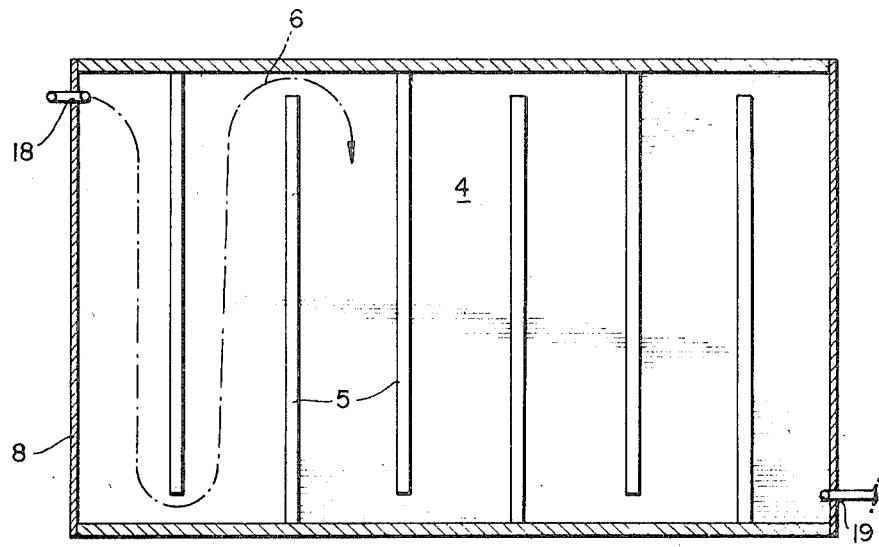
FIG. 2 is a plan view of the irradiating device taken along the line 2—2 of FIG. 1.
Figure 3:
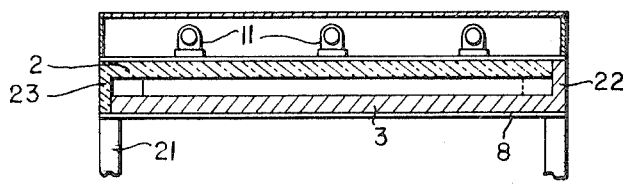
FIG. 3 is a cross section of the device taken along line 3—3 of FIG. 1.

Positioned opposite one of the plates 2 or 3 is an actinic light source, and in the preferred embodiment illustrated in FIGS. 1 to 3, the light source 7 is positioned opposite the upper plate 2. The upper plate 2 is transparent to actinic light rays in the wavelength between the range of 3,500 to 4,500 A. By arranging the light source 7 on the unit 1 in the stated manner, the light rays are projected directly at the liquid passing along the tortuous path formed by the spaced plates and dividers. A number of lights 7 may be provided along the upper surface of the unit 1 so as to increase the intensity of light projected at the liquid flowing through the chamber and thus shorten the time which the unit requires for the accelerated aging of the alcoholic beverages.

The unit is provided with channels 8 on each end thereof for securing the spaced plates 2 and 3 in fluidtight connection. The channels 8 are provided with rails 9 spaced from each other and the rails 9 cooperate with tracks 10 in the plates 2 and 3 for securing the plates 2 and 3 in the properly spaced relationship.

On the upper surface of the channels 8 are provided yokes 11 which operate to hold the light tubes 7 in the properly spaced relation with respect to the plates 2 and 3 and the chamber 4. The channels 8 for securing the plates 2 and 3 in properly spaced relation are preferred because they permit the plates 2 and 3 to be readily removed by sliding them transversely of the unit so that the entire unit may be readily and easily disassembled for cleaning and inspection. Other securing arrangements are possible, but I have found this arrangement to be particularly satisfactory since the large amount of sediment and other materials found within unaged alcoholic beverages tend to coat and clog the very thin chamber 4 formed by the plates of the present unit.

The present invention is also provided with a pump 15 through which is passed the beverages to be irradiated, and the pump 15 forces the beverage through the valve 16 and the pipe 17 into the lower portion of the chamber. It is important in the irradiation of alcoholic beverages to accelerate the aging thereof to ensure that the irradiation process takes place in the absence of any air so that the beverage is subjected to the full force of the actinic light rays. For this reason, the device is tilted so that the chamber 4 is an angle to the horizontal and the liquid is forced up the inclined plane through the tortuous path while simultaneously forcing the air out of the outlet of the unit so that when performing a continuous process with the present unit, once the unit is filled, the irradiation takes place in the absence of any adverse atmospheric conditions. The inlet 18 at the lower portion of the unit may be provided in the channel 8 so that the pipe 17 can be readily connected and disconnected with the unit. This arrangement greatly facilitates packaging and subsequent assembly once the entire unit has been manufactured for shipping. An outlet at the upper end of the chamber 4 is provided for receiving the processed beverage, and a valve may be provided for receiving the processed beverage and the valve may be provided on the outlet for shutting off the flow through the unit. When the outlet 19 is provided with a valve as illustrated at 20, it is preferred that the valve 20 be connected to the source of energy for the light 7. Thus, as liquid passes through the unit, the open valve also operates to form a connection for the power of the light 7 so that the light will be on when the valve is open. By this arrangement, when liquid is passing through the unit, if the valve is shut off after a certain amount of liquid has been processed, the light will also be shut of so that the liquid passing through the unit will not be over exposed.

It has been found tat there is a critical range of exposure for alcoholic beverages on order to properly accelerate the aging of the beverage without harmfully effecting the taste thereof, and the present unit should be designed so that as the liquid is forced though the unit, the proper degree of intensity and time of irradiation are controlled whereby the liquid passing through one full cycle of the unit will be properly aged. The relation between the required time of exposure and intensity of the irradiation in the process is more fully disclosed in my copending application, Ser. No. 835,536, the details of which are incorporated herein by reference, and it is desirable that the flow rate by controlled consistent with the teachings of such application in order to ensure a proper accelerated aging of the beverage passing through the unit. This control can be effected by controlling the pumping flow rate and chamber size.

Supports 21 are provided on the unit 1 for positioning same at an acute angle to the horizontal in order to assist in controlling the flow rate of fluid passing through the unit and assure that the irradiation process takes place in the absence of any adverse atmospheric conditions. Of course, it is also contemplated that the chamber 4 could be very thin to force the liquid to operate as a plunger and assure that the liquid exhausts all air from the unit when passing through the unit. If this type of construction were employed, it would be possible to provide a unit not having a pump but wherein the inlet for the unit would be at the upper portion of the chamber 4 and the flow of the liquid through the unit would be due to the forces of gravity with the angle of inclination being chosen as such to assure that the liquid would pass though the unit over a period of time sufficient to properly accelerate the age of the alcoholic beverage without the adverse effects resulting from over or under exposing the liquid.

Referring now to FIG. 3, a cross section of the device is illustrated from which the yokes 11 can be clearly seen and their connection to the channels 8. A preferred arrangement for the plates 2 and 3 is to provide the plates with legs 22 and 23 which operate to completely enclose the chamber 4. Other convenient arrangement for sealing the chamber formed by the plates 2 and 3 may be provided, but the provision of integral legs on each of the plates has been found to be extremely satisfactory since the entire unit may be molded and is very easily assembled and disassembled for cleaning. Of course, it would be necessary to provide either a snap type arrangement on the plates 2 and 3 to secure their fluidtight connection or some sort of clamping device of any conventional structure for assuring this fluidtight relation.

Having described the preferred embodiment of the invention, what is claimed is:

1. Apparatus for artificially aging alcoholic beverages comprising
   a first plate of a material transparent to actinic light rays;
   a second plate disposed in parallel spaced relationship with said first plate to define a chamber therebetween having a first end and a second end;
   partition means disposed in said chamber to divide said chamber into a plurality of communicating compartments;
   an actinic light source positioned adjacent said first plate for irradiating liquid flowing through said compartments;
   support means for positioning said first and second plates at an acute angle to the horizontal with said first end of said chamber lower than said second end of said chamber;
   an inlet communicating with said first end of said chamber;
   an outlet communicating with said second end of said chamber; and
   means for supplying an alcoholic beverage to be artificially aged to said inlet under pressure whereby filling of said chamber with the alcoholic beverage evacuates air from said chamber such that the alcoholic beverage may be continuously artificially aged in the absence of air.

2. The apparatus as recited in claim 1 and further comprising a pump communicating with said inlet to force the alcoholic beverage upwardly from said first end to said second end of said chamber.

3. The apparatus as recited in claim 1 wherein said first and second plates are held together in spaced relation by a pair of channel members.

4. The apparatus as recited in claim 3 wherein said channel members are provided with spaced rails and said first and second plates are provided with tracks riding on said rails to assure the spaced relation of said first and second plates.

5. The apparatus as recited in claim 3 wherein said inlet and said outlet are formed in said channel members, and piping means are removably connected to said inlet and said outlet.

6. The apparatus as recited in claim 1 wherein said partition means includes a plurality of dividers integral with one of said first or second plates and having a length less than the width of said chamber said dividers being alternately connected to one side of said chamber and spaced from the other side of said chamber.

7. The apparatus as recited in claim 1 wherein said light source irradiates the alcoholic beverage with rays in the wavelength of 3,500–4,500 A.

* * * * *